United States Patent [19]

Iwanaga et al.

[11] 3,912,050

[45] Oct. 14, 1975

[54] TRANSMISSION PARKING LOCK MECHANISM

[75] Inventors: Kazuyoshi Iwanaga, Yokosuka; Tamio Kawamoto, Yokohama; Toshiyuki Miyauchi, Yokohama; Kunio Ohtsuka, Yokohama, all of Japan

[73] Assignee: Nissan Motor Company Limited, Yokohama, Japan

[22] Filed: Apr. 15, 1974

[21] Appl. No.: 461,132

[30] Foreign Application Priority Data

Apr. 16, 1973 Japan.............................. 48-42940

[52] U.S. Cl.................................... 188/69; 192/4 A
[51] Int. Cl.²....................... B60T 1/00; B60T 1/02
[58] Field of Search ......... 192/4 A, 109 A; 188/69, 188/31

[56] References Cited
UNITED STATES PATENTS

| | | | |
|---|---|---|---|
| 2,860,731 | 11/1958 | Hause | 188/69 |
| 2,875,856 | 3/1959 | Mrlik | 192/4 A X |
| 3,187,846 | 6/1965 | Powell | 188/69 |
| 3,386,532 | 6/1968 | Moss | 192/4 A X |
| 3,601,230 | 8/1971 | Platz | 192/4 A X |
| 3,690,416 | 9/1972 | Yamada | 188/69 |

*Primary Examiner*—Benjamin W. Wyche

[57] ABSTRACT

A control rod carrying a pawl actuating cam is formed with a pin. A cam lever mounted on a driver operable brake actuator shaft includes a cam surface engageable with the pin for movement of the rod toward and away from the brake applying position. A yieldable lost motion connection is provided between the brake actuator shaft and the cam lever or between the control rod and the pawl actuating cam.

5 Claims, 16 Drawing Figures

TRANSMISSION PARKING LOCK MECHANISM

This invention relates generally to a locking system, and more particularly to a positive acting parking lock especially for use with automatic power transmission mechanism for automotive vehicles.

Parking lock mechanisms that are used with automotive vehicle power transmission usually employ a toothed parking gear and gear engaging pawl, the latter being oscillatably mounted in a power transmission housing. The parking gear is carried by a transmission output shaft. Linkage means are provided for urging the pawl into mesh with the teeth of the parking gear thereby establishing a positive connection between the output shaft and the stationary transmission housing.

There are known linkage means which comprise an axially movable control rod which carries a cam portion at one end adjacent to the heel of the parking pawl. The other end of the control rod is pivotally connected to a manually operable lever or link which is mounted around a parking lock actuator shaft adapted to be rotated by a driver through a manual range selector lever. When the shaft is rotated to a parking position, the cam portion carried by the control rod will engage the pawl and will urge it into mesh with the teeth of the parking gear. Such prior mechanisms have a shortcoming that the maximum stroke in which the control rod reciprocates is relatively long thus requiring an enlarged space for accommodating the mechanism.

It is an object of this invention to provide an improved parking lock mechanism of the type referred to which is disposed within the transmission housing with a minimum amount of space being required.

It is another object of this invention to provide an easy and space-saving mounting of a control rod of the parking lock mechanism of the type preferred to in which at least one end of the control rod is axially movably supported in a bore formed in a staitonary structure such as the transmission housing.

For the purpose of describing more particularly other objects, features and advantages of the invention, reference will be made to the accompanying drawings, wherein.

Figure 16:
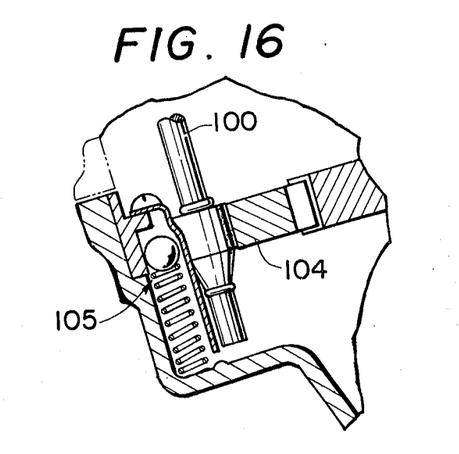
FIG. 16 is a cross sectional view taken along the section XVI—XVI of FIG. 15.

Referring first to the prior mechanisms shown in FIGS. 13 to 16, reference numeral 100 indicates a control rod having one end connected at 102 to a detent plate 101 rotatable with a brake actuator shaft 103. The operation of such mechanisms and their associated drawbacks will appear from the foregoing description and the drawings. It should be particularly noted that, as shown in FIG. 16, the lost motion connection to urge the parking pawl 104 toward a brake applying position when the pawl tooth is misaligned with the parking gear, is provided on a reaction member 105 mounted on the transmission housing.

Referring now to the improved parking lock mechanism shown in FIGS. 1 to 10, a power transmission housing 10 accommodates therein a conventional toothed parking gear 11 mounted on a transmission output shaft 12 and parking pawl 13 carried by a supporting shaft 14. The pawl 13 has formed thereon a ratchet tooth 15 engageable with the teeth of the parking gear 11 in its brake applying position. Pawl 13 is normally urged to be out of engagement with the parking gear 11 by means of a pawl release spring 16. The pawl tooth 15 comes into engagement with the parking gear 11 when a driver operated cam portion 41, that will be later described, engages the heel of the pawl 13 and urges the tooth 15 toward the parking gear teeth against the action of the spring 16.

Figure 1:
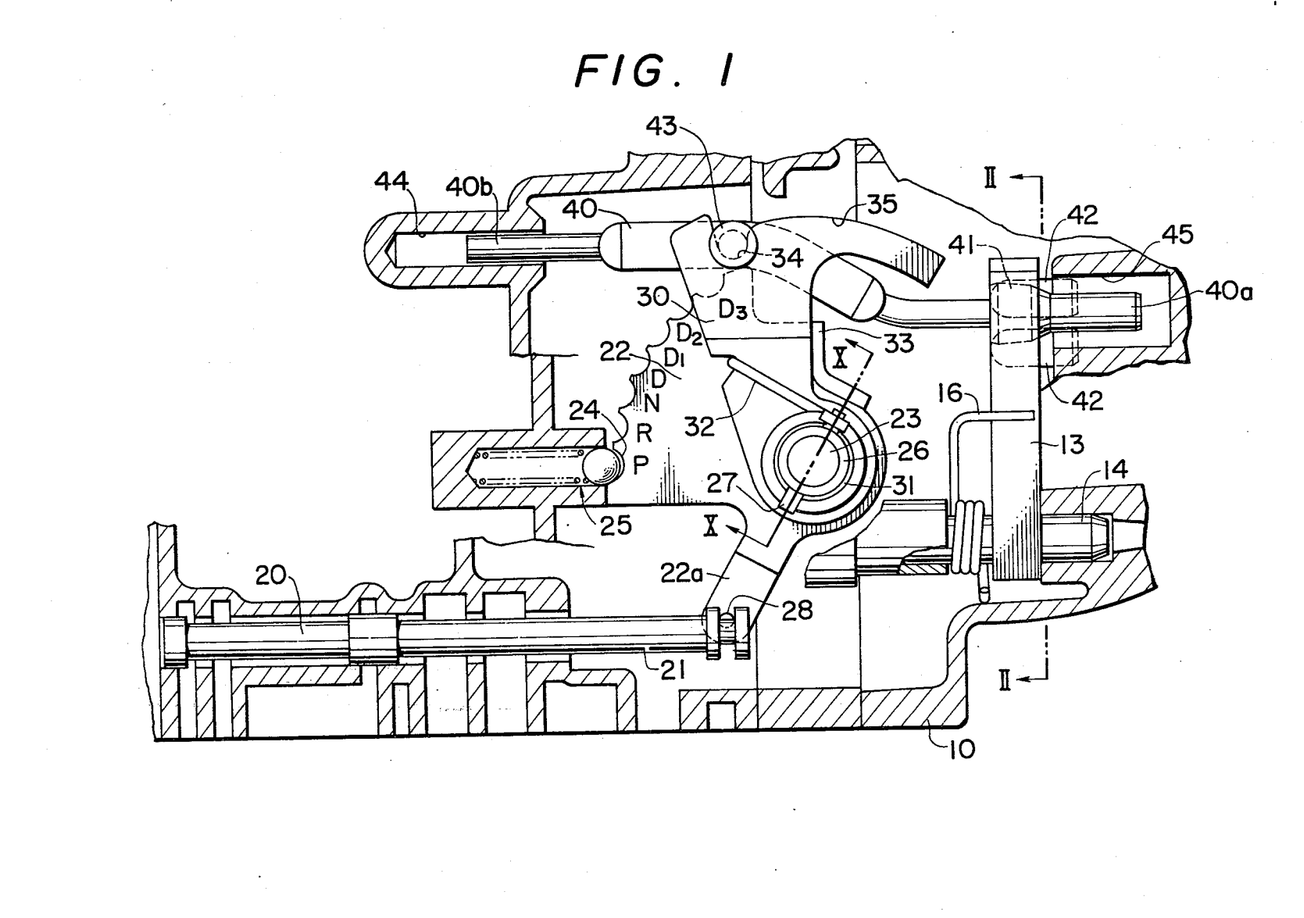
FIG. 1 shows a longitudinal section view of a preferred embodiment of a parking lock mechanism of the invention accommodated in a power transmission housing, showing a locking position of the mechanism.
Figure 4:
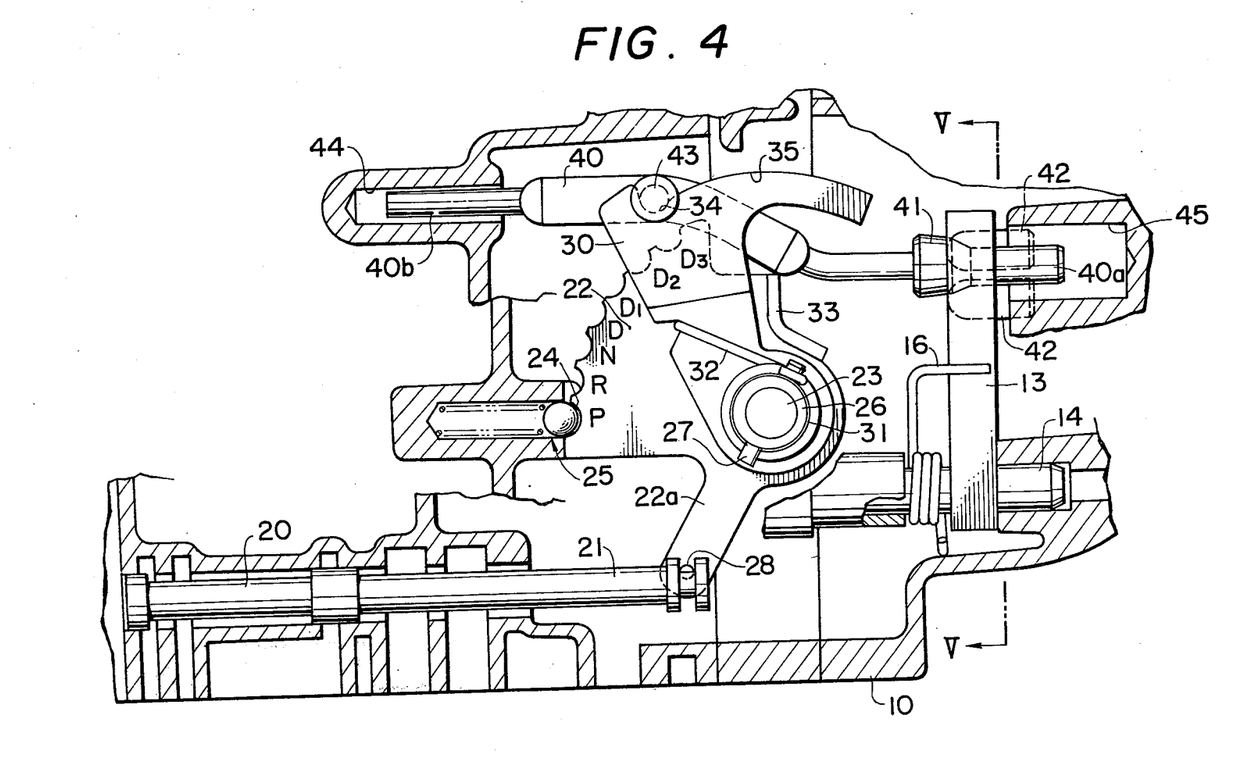
FIG. 4 is a view similar to FIG. 1 showing a condition in which the parking pawl tooth is misaligned with its associated parking gear teeth.
Figure 7:
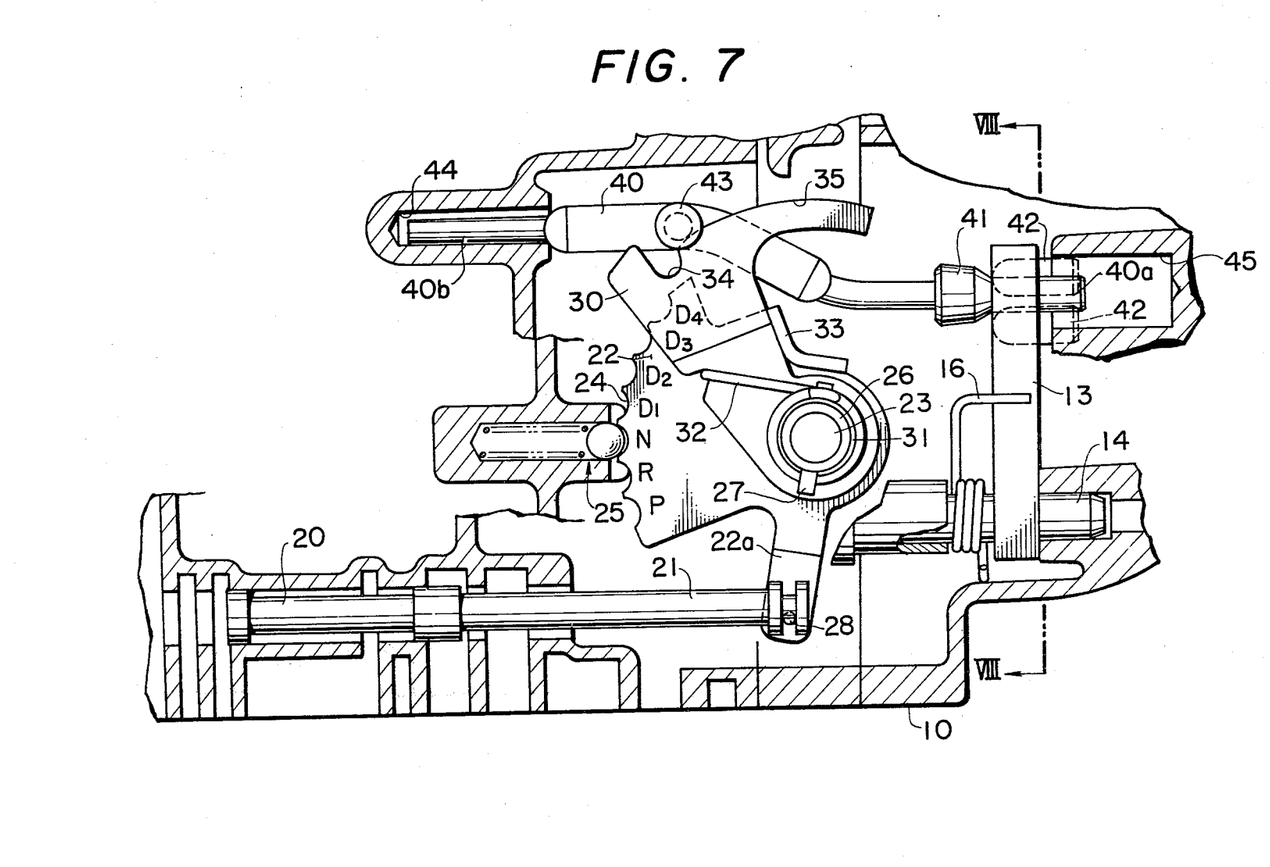
FIG. 7 is a view similar to FIG. 1 showing a non-braking, neutral position of the mechanism.
Figure 8:
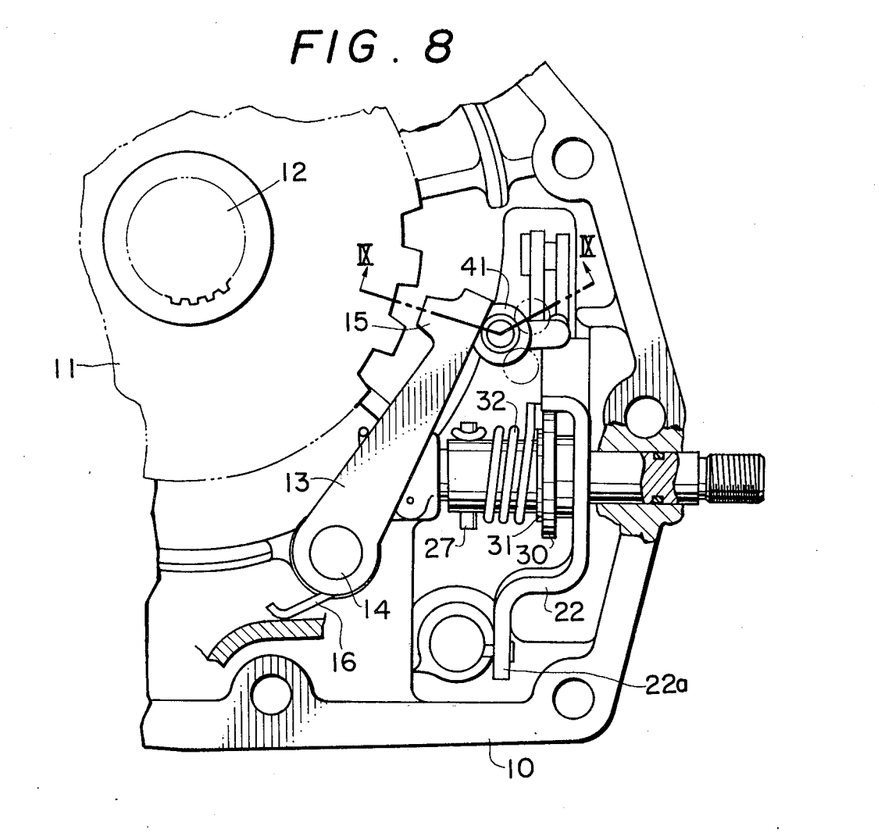
FIG. 8 is an enlarged cross-sectional view taken along the section line VIII—VIII of FIG. 7.
Figure 9:
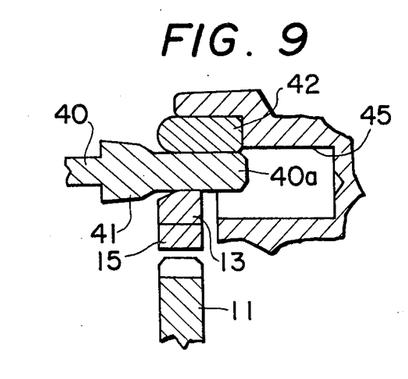
FIG. 9 is a fragmentary cross-sectional view taken along the section line IX—IX of FIG. 8.

The housing 10 further includes a manual range selector valve 20 particularly shown in FIGS. 1, 4 and 7, which forms a part of automatic hydraulic control device (not shown) of a power transmission. A valve plunger 21 of the selector valve 20 has a forked end to which an extended end 22a of a detent plate 22 is connected by means of a pivot pin 28. The detent plate 22 is mounted on a rotatable parking lock actuator shaft 23 which is adapted to be connected to a driver operated transmission drive range selector lever (not shown) located within the vehicle passenger compartment. As is known, the detent plate 22 is formed with a plurality of notched recesses 24 in the periphery thereof, which respectively correspond to the drive and parking positions selectable by the selector lever. A ball and spring type detent 25 is engageable with one of the recesses 24 to lock the detent plate 22 into the selected drive or parking position.

Figure 2:
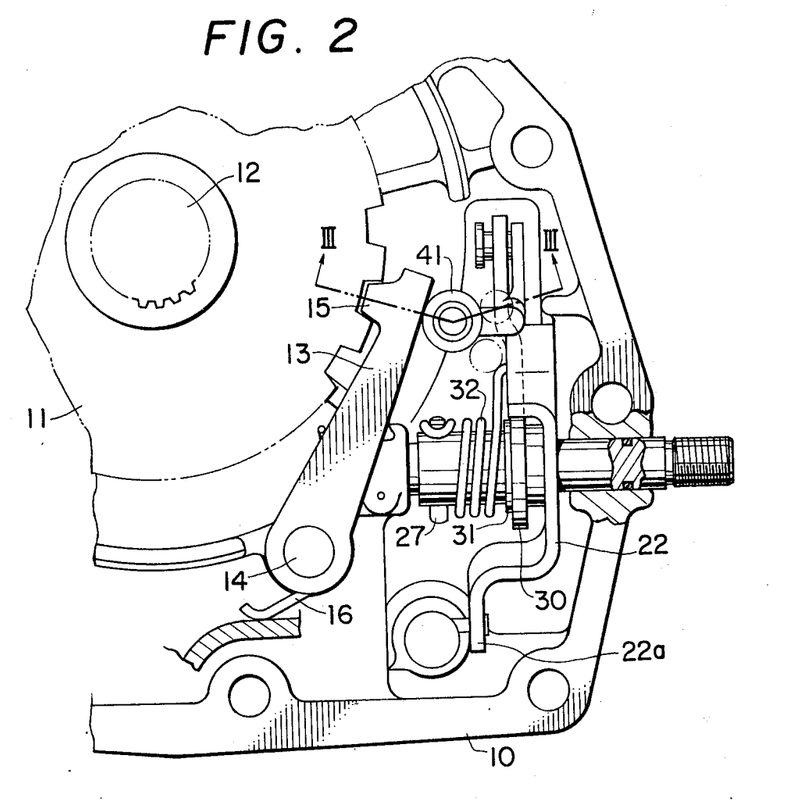
FIG. 2 is an enlarged cross-sectional view taken along the section line II—II of FIG. 1.
Figure 10:
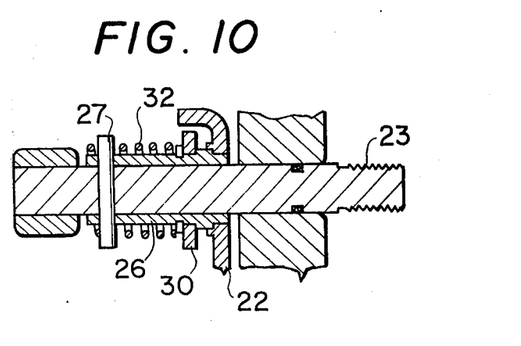
FIG. 10 is a fragmentary cross-sectional view taken along the section line X—X of FIG. 1.

Extending axially from the detent plate 22 is a sleeve 26 which surrounds the brake actuator shaft 23 and fixed to the same by a connecting pin 27 extending through the sleeve 26 and the shaft 23 (see FIGS. 2 and 10). A cam lever 30 is freely rotatably mounted on the sleeve 26 through a snap ring 31. The cam lever 30 is provided with a cam spring 32 wound around the sleeve 26, one end of which is anchored to the pin 27 while the other is secured to the surface of the cam lever 30. The cam spring 32 is pre-loaded so that a constant force is applied to the cam lever 30 to urge the latter in a direction of the shaft 23 toward the parking position, that is, in a clockwise direction as viewed in FIGS. 1, 4 and 7. A stop or abutment 33 is secured to or extends from the detent plate 22 so as to limit the movement of cam lever 22 due to the action of the spring 32. The cam lever 30 includes a cam surface consisting of a recessed portion 34 and a curved raised surface 35 continuous to the recessed portion, both being formed on the upper periphery of the cam lever 30.

There is provided an axially movable control rod element 40 extending in a longitudinal direction of the transmission housing 10. One end 40a of the rod integrally carries the cam portion or shoulder 41 engageable with the parking pawl 13 to urge it into a brake applying position as previously mentioned. Two pins 42 with spherical end surfaces, serving as reaction members, are fixed to a portion of the housing wall adjacent the pawl 13. This one end 40a of the rod 40 is thus supported by the pawl 13 and the two pins 42. There is formed an elongate bore 44 in a stationary structure such as the transmission housing 10, which bore loosely receives the other end 40b of the control rod 40 in a manner allowing a limited axial movement of the rod. This way of supporting the control rod is advantageous in that the rod is mounted especially easily without any particular mount member being required and within a minimized space for accommodation. The one end 40a of the rod may be, as shown, received in a bore 45 formed in the opposite end wall of the housing 10 in a similar manner. The axes of the bore 44 and 45 are preferably misaligned to prevent axial rotation of the rod, the latter being curved to be supported in the misalinged bores 44 and 45.

The control rod 40 further carries a pin 43 at its middle fortified portion (no numeral), the pin extending transversely to the axis of the rod 40. The pin 43 is adapted to be situated within the recessed portion 34 of the cam lever 30 and to ride up and down the raised surface 35 so as to move the rod 40 axially in accordance with the oscillation of the cam lever 30.

Figure 3:
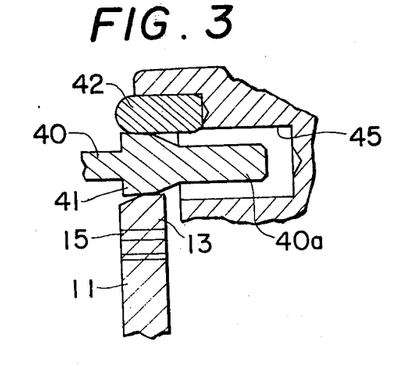
FIG. 3 is a fragmentary cross-sectional view taken along the section line III—III of FIG. 2.
Figure 5:
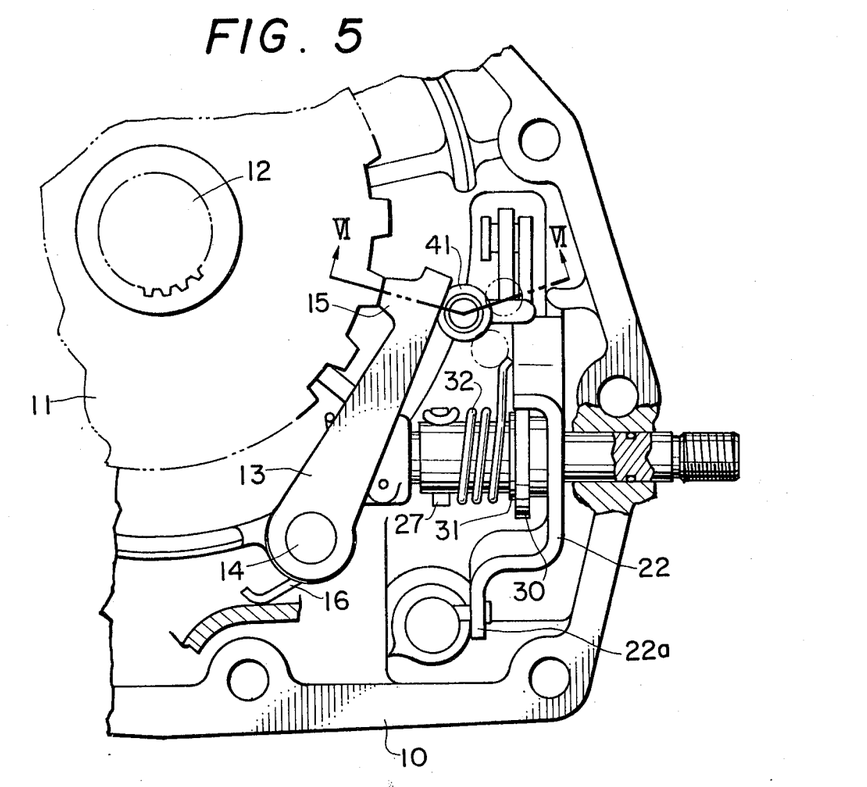
FIG. 5 is an enlarged cross-sectional view taken along the section line V—V of FIG. 4.
Figure 6:
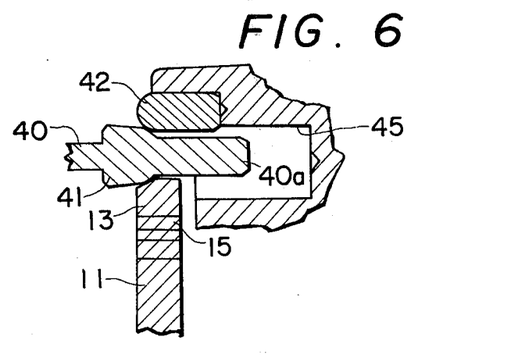
FIG. 6 is a fragmentary cross-sectional view taken along the section line VI—VI of FIG. 5.

As will be readily understood from the foregoing description, FIGS. 1 to 3 show the parking lock mechanism of the invention in a parking position selected. The detent ball is engaged in the recess 24 corresponding to the parking position of the detent plate 22. The cam lever 30 is urged in the clockwise direction by the spring 32 to the extent allowed by the stop 33 thereby urging the control rod 40 into the brake applying position through the engagement of pin 43 in the recessed portion 34. When the pawl tooth and the parking gear teeth are aligned, the cam shoulder 41 can be moved into the brake applying position thus urging the toothed pawl into engagement with the parking gear teeth. If the parking gear teeth and the pawl are misaligned as shown in FIG. 5, the spring 32 will yield as viewed in FIG. 4. As soon as the shaft 12 is rotated slightly, the pawl 13 will be urged into the locking position by the spring 32.

As the brake actuator shaft 23 is rotated to a nonparking position, for instance, to a neutral position shown in FIG. 7, the detent plate 22 is rotated in a counterclockwise direction, the cam lever 30 being rotated in the same direction by means of the stop 33. This movement of the cam lever 30 will cause the rod 40 to move in the left-hand direction as viewed in FIG. 7 so that the cam shoulder 41 is withdrawn from the brake applying position. When the shaft 23 is further rotated, the pin 43 will then ride up the side surface of the recess 34 and will engage the raised surface 35, whereupon the rod 40 is no longer moved.

Figure 11:
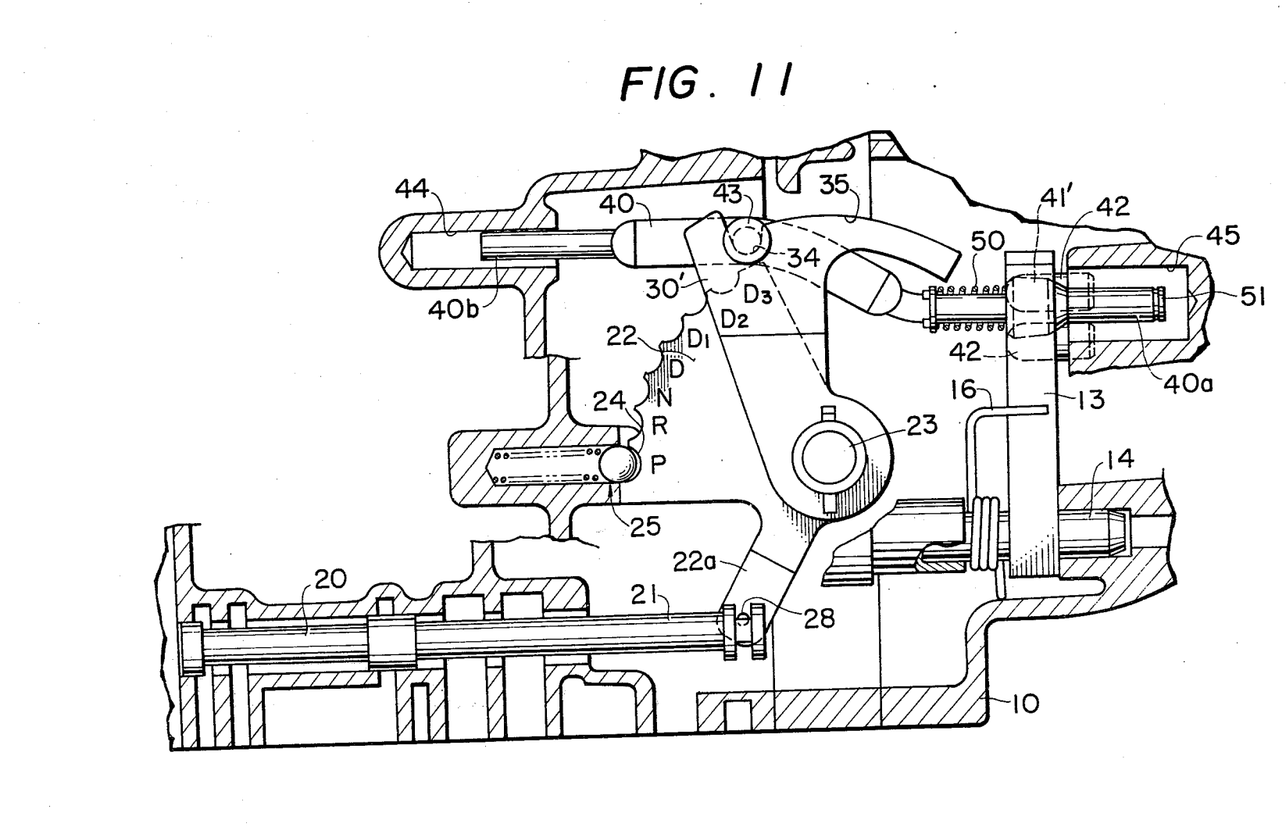
FIG. 11 shows a longitudinal section view of another preferred embodiment of a parking lock mechanism according to the invention.

In another preferred embodiment shown in FIG. 11, a cam lever 30' is fixedly carried on the brake actuator shaft 23 so that simultaneous oscillation of the cam lever 30' and the detent plate 22 is effected by rotation of the shaft 23. A cam shoulder 41' in this example is mounted on the control rod 40 in a manner slidable relative to each other. A spring 50 is mounted on the control rod 40 and anchored to the cam shoulder 41' and the washer (no numeral) fixed around the control rod 40. This spring 50 provides a lost motion connection between the actuator shaft 23 and the cam shoulder 41' exactly like the spring 32 of the first embodiment. This is provided a stop 51 to limit the movement of the cam shoulder 41'.

Figure 12:
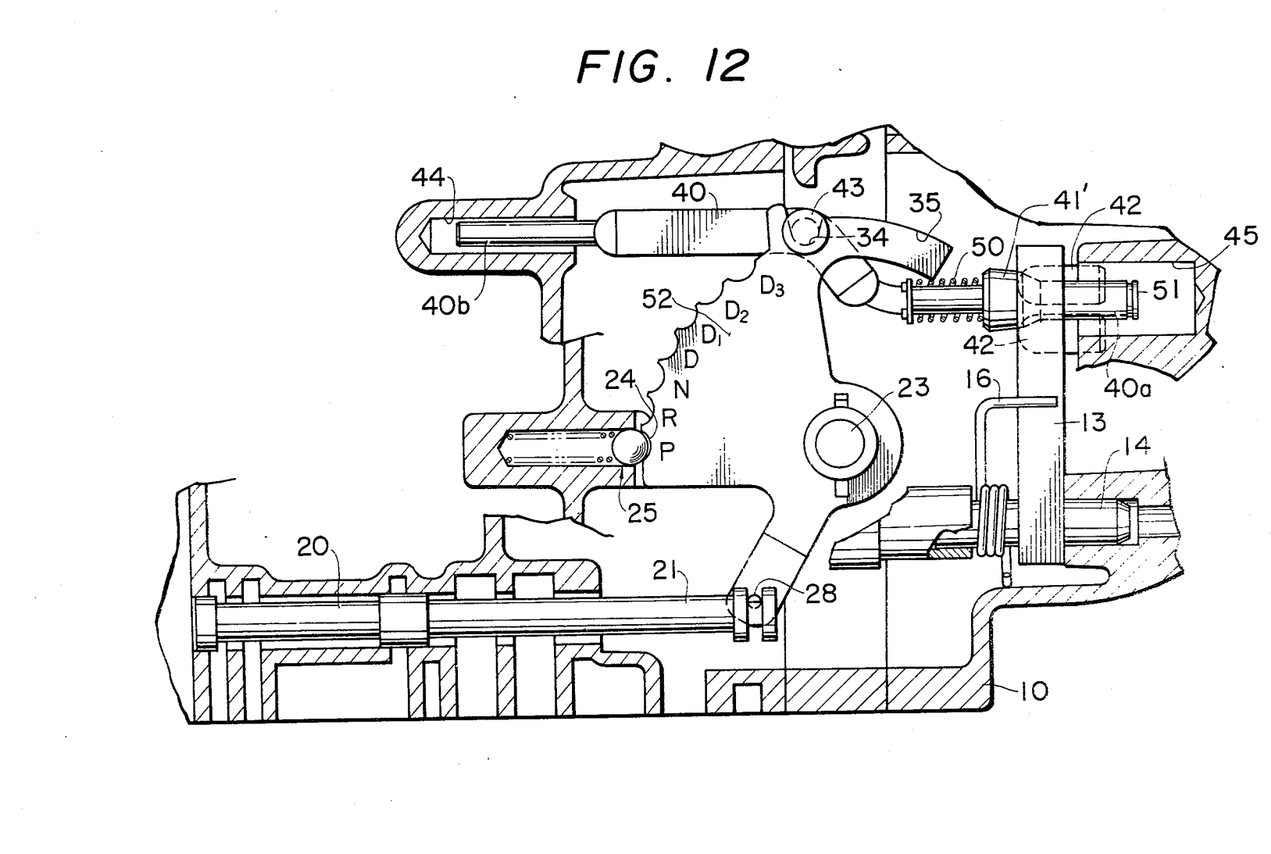
FIG. 12 shows a longitudinal section view of a further preferred embodiment of a parking lock mechanism according to the invention.
Figure 13:
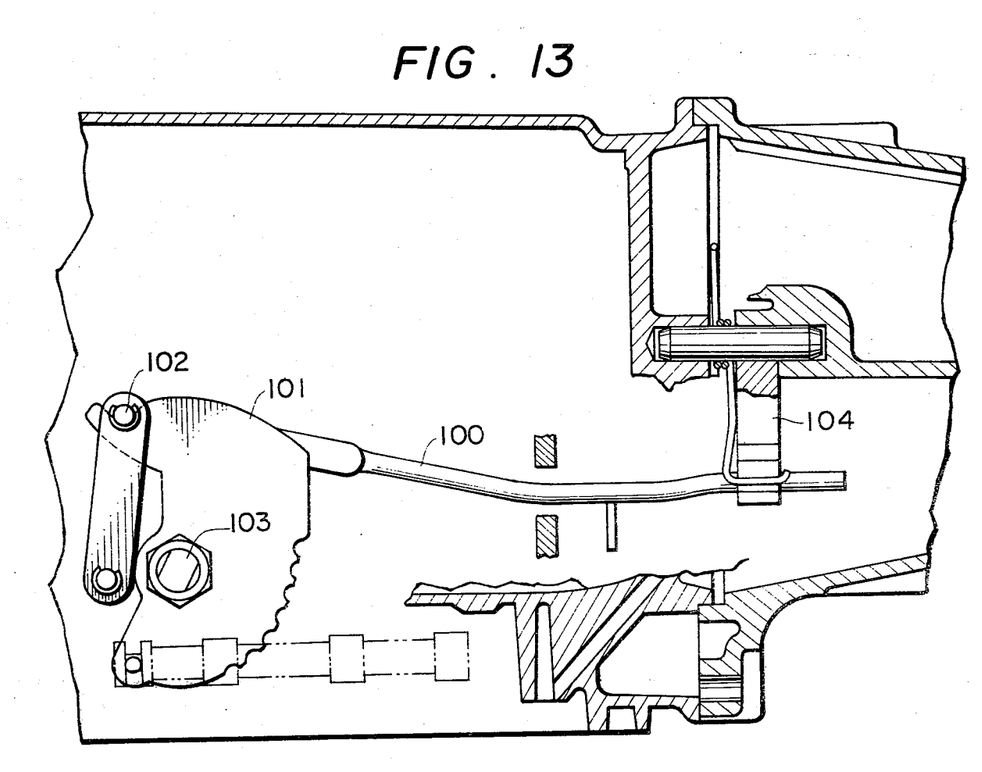
FIG. 13 is a longitudinal section view of a prior art parking lock mechanism.
Figure 14:
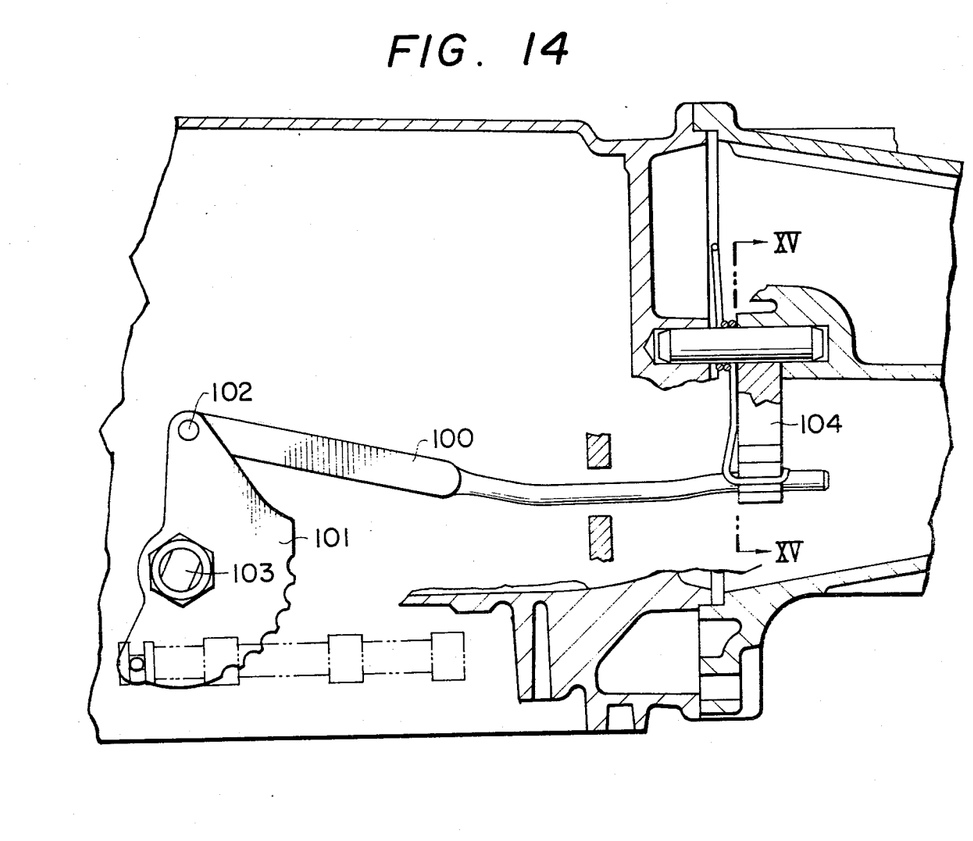
FIG. 14 is a longitudinal section view of another prior art parking lock mechanism.
Figure 15:
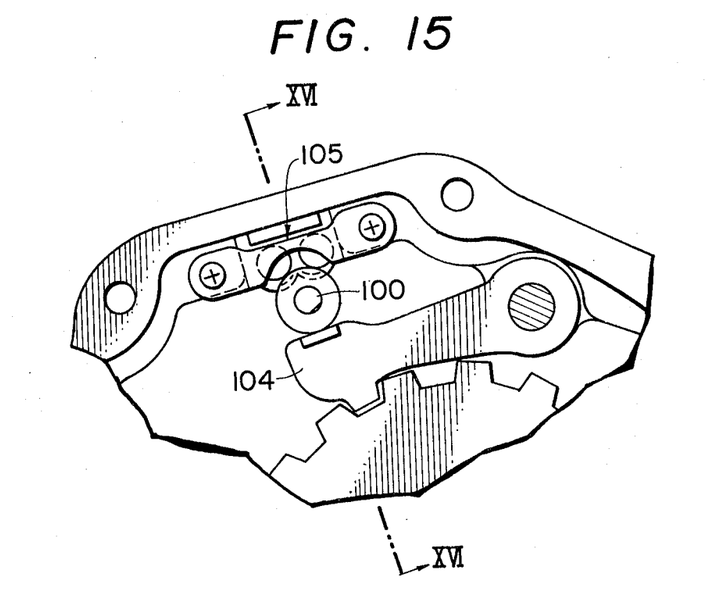
FIG. 15 is a cross sectional view taken along the section line XV—XV of FIg. 14.

A further embodiment shown in FIG. 12 differs from the second embodiment mentioned above only in that the cam lever and detent plate are formed integral to provide a common plate 52.

What is claimed is:

1. In a parking lock mechanism for locking the output shaft of a power transmission having a parking gear carried by said output shaft, a toothed parking pawl oscillatably mounted on a portion of a relatively stationary structure of said mechanism and an actuating cam engageablel with said parking pawl in its locking position: the improvement comprising a control rod having one end carrying said actuating cam, the control rod having a curved bent intermediate between two opposite ends thereof to provide two extended, mutually parallel and misaligned portions, said end portions being respectively received in two elongate, misaligned bores formed in said stationary structure in a manner allowing a limited axial movement of the control rod; means for applying force on said control rod to urge said actuating cam into its locking position; an yieldable lost motion connection between said force applying means and said actuating cam, said force applying means including a manually rotatable shaft, a pin extending from the midpoint of the control rod transversely to the axis thereof, a cam surface engageable with said pin, said pin following the cam surface upon movement of said cam lever in one direction to move said control rod toward the locking position, and in the opposite direction to move said control rod to an unlocking position at which the control rod is retained by engagement of the pin with the cam surface during further movement of the cam lever in said one direction.

2. In a parking lock mechanism for locking the output shaft of a power transmission having a parking gear carried by said output shaft, a toothed parking pawl oscillatably mounted on a portion of a relatively stationary structure of said mechanism and an actuating cam engageable with said parking pawl in its locking position: the improvement comprising a control rod having one end carrying said actuating cam and having a pin extending from the midpoint of said control rod transversely to the axis thereof, the control rod having a curved bent intermediate between two opposite ends thereof to provide two extended, mutually parallel and misaligned end portions, said end portions being respectively received in two elongate, misaligned bores formed in said stationary structure in a manner allowing a limited axial movement of the control rod; a manually operable shaft rotatable to any one of a plurality of driver selectable drive positions including a neutral position and a parking position; a cam lever cooperatively mounted on said manually rotatable shaft, said cam lever having a cam surface formed with a recessed portion and a raised portion, the pin engaging the recessed portion and raised portion upon movement of said cam lever to move the control rod in two opposite directions between locking and unlocking positions in a distance corresponding to the angular movement of the manually operable shaft between the neutral and parking positions; means to resiliently urged said actuating cam toward the locking position upon rotation of the manually rotatable shaft to the parking position.

3. In a parking mechanism for locking the output shaft of a power transmission having a parking gear carried by said output shaft, a toothed parking pawl oscillatably mounted on a portion of a relatively stationary structure of said mechanism and an actuating cam engageable with said parking pawl in its locking position: the improvement comprising a control rod having one end integrally carrying said actuating cam and having a pin extending from the midpoint of the rod transversely to the axis thereof, the control rod having a curved bent intermediate between the opposite ends thereof to provide two extended, mutually parallel but misaligned end portions, said end portions being respectively received in two elongate, misaligned bores formed in said stationary structure in a manner allowing a limited axial movement of the control rod; a manually rotatable shaft; a cam lever freely rotatably mounted on said rotatable shaft and having a cam surface engageable with said pin, said pin following the cam surface upon movement of said cam lever in one direction to move said control rod toward the locking position and in the opposite direction to move said control to an unlocking position at which the control rod is retained by engagement of the pin with the cam surface during further movement of the cam lever in said one direction; a yieldable lost motion connection between said rotatable shaft and said actuating cam comprising a spring disposed around said rotatable shaft, the ends of which are anchored respectively to said shaft and to said cam lever, said spring being preloaded to urge said cam lever toward the locking position and a stop rotatable with said shaft to limit the rotation of the cam lever by the force of said spring.

4. In a parking lock mechanism for locking the output shaft of a power transmission having a parking gear carried by the output shaft, a toothed parking pawl oscillatably mounted on a portion of a relatively stationary structure of said mechanism and an actuating cam engageable with said parking pawl in its braking position: the improvement comprising a control rod having one end axially slidably carrying said actuating cam and having a pin extending from the midpoint of said rod transversely to the axis thereof, the control rod having a curved bent intermediate between the two opposite ends thereof to provide two extended, mutually parallel and misaligned end portions, said end portions being respectively received in two elongate, misaligned bores formed in said stationary structure in a manner allowing a limited axial movement of the control rod; a manually rotatable shaft; a cam lever fixed around said rotatable shaft for simultaneous rotation therewith and having a cam surface engageable with said pin for movement of said control rod toward and away from the locking position; a yieldable lost motion connection between said actuating cam and said control rod comprising a spring disposed between separate spring seat portions carried by said actuating cam and said rod respectively said spring being pre-loaded to urge said actuating cam toward the locking position and a stop mounted on said one end of the control rod to limit the movement of the actuating cam by the force of said spring.

5. In a parking lock mechanism for locking the output shaft of a power transmission having parking gear carried by the output shaft, a toothed parking pawl oscillatably mounted on a portion of a relatively stationary structure of said mechanism and an actuating cam engageable with said parking pawl in its locking position: the improvement comprising a driver operable control rod having one end axially slidably carrying said actuating cam and having a pin extending from the midpoint of said rod transversely to the axis thereof, the control rod having a curved bent intermediate the two opposite ends thereof to provide two extended, mutually parallel and misaligned end portions, said end portion being respectively received in two elongate, misaligned bores formed in said stationary structure in a manner allowing a limited axial movement of the control rod; a manually rotatable shaft; a cam lever fixed around said rotatable shaft for simultaneous rotation therewith and having a cam surface engageable with the pin for movement of said control rod toward and away from the locking position, said cam lever having formed integrally with a detent plate which detents said rotatable shaft to an angular position corresponding to a selected one of a plurality of transmission drive positions and a parking position; a yieldable lost motion connection between said actuating cam and said control rod comprising a spring disposed between separate spring seat positions carried by said actuating cam and said control rod respectively, said spring being adapted to urge the actuating cam to the locking position and a stop mounted on said one end of the control rod to limit the movement of the actuating cam by the force of said spring.

* * * * *